No. 883,665. PATENTED MAR. 31, 1908.
J. G. NOLEN.
COMBINED POLICE CALL, FIRE ALARM, AND WATCHMAN'S BOX.
APPLICATION FILED MAR. 3, 1904.
5 SHEETS—SHEET 1.
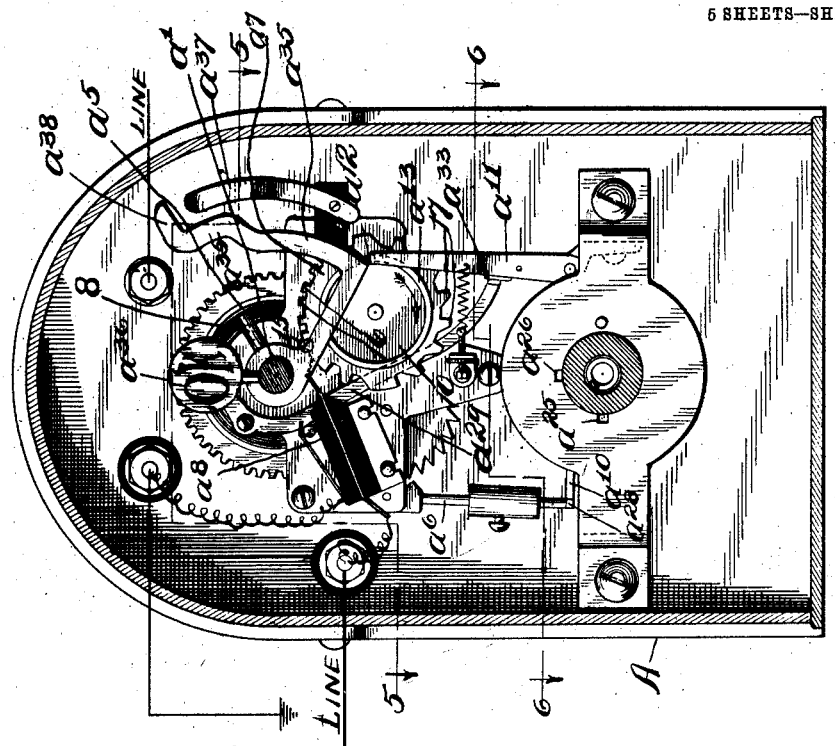
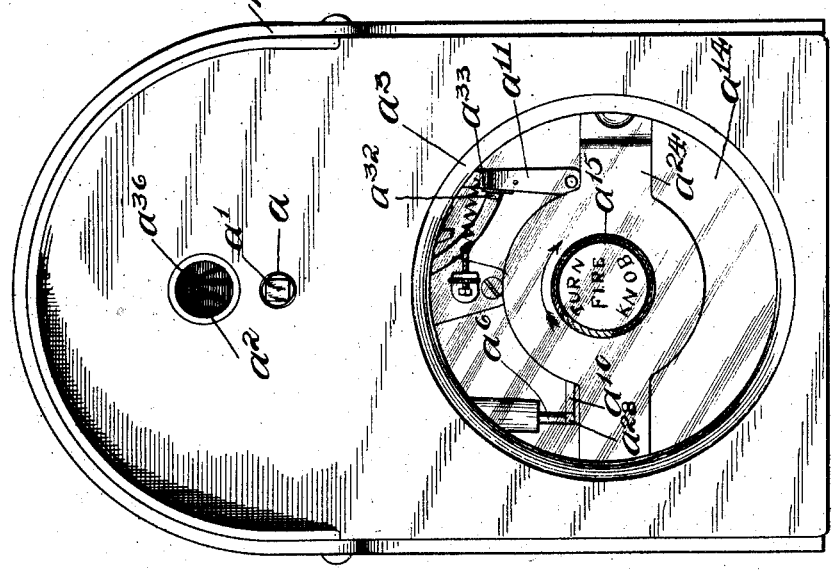
Witnesses:
J B Weir
Robert H Weir
Inventor:
James G. Nolen
By Bulkley & Durand
Attys.

No. 883,665. PATENTED MAR. 31, 1908.
J. G. NOLEN.
COMBINED POLICE CALL, FIRE ALARM, AND WATCHMAN'S BOX.
APPLICATION FILED MAR. 3, 1904.
5 SHEETS—SHEET 2.
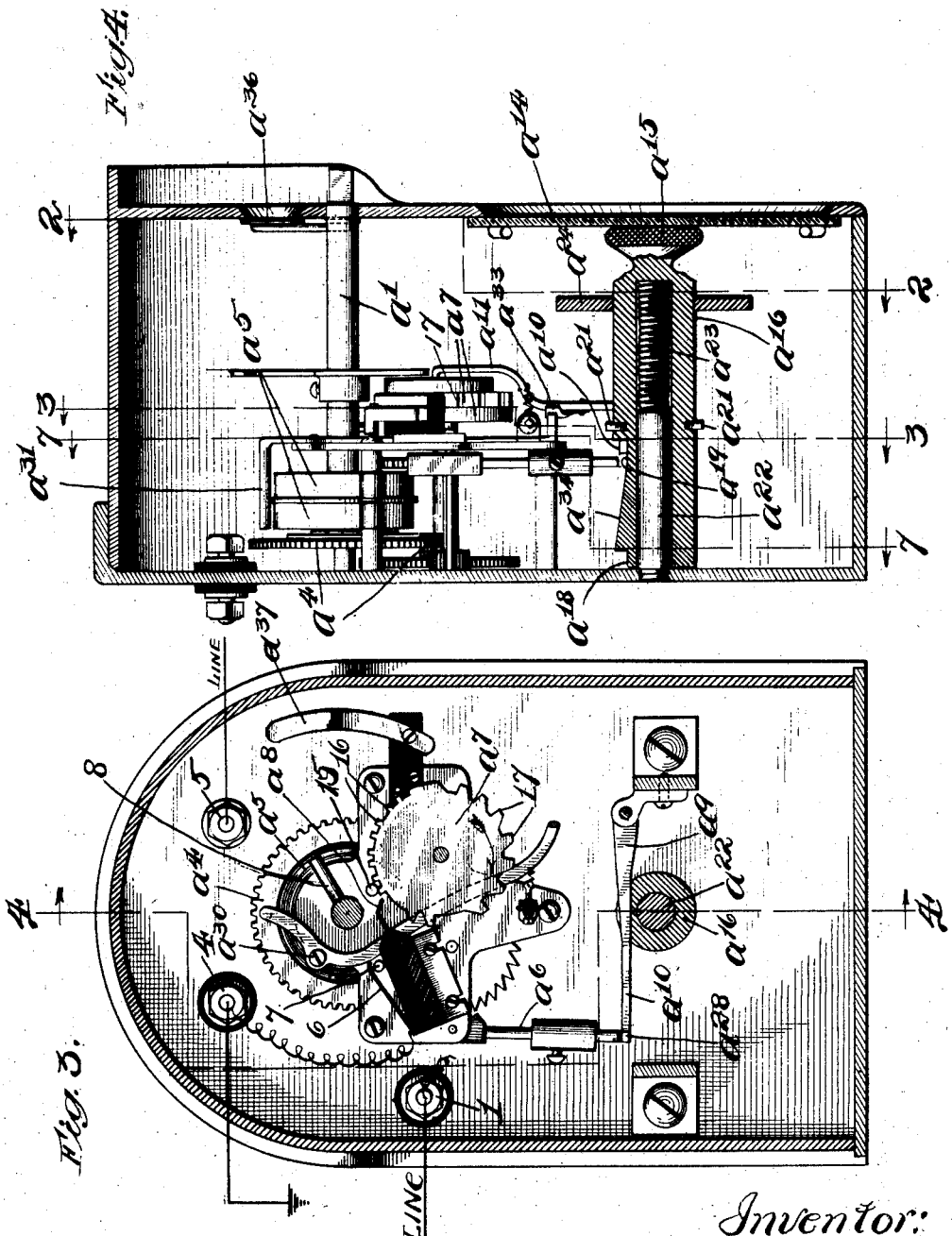
Witnesses:
J B Weir
Robert H Weir
Inventor:
James G. Nolen
By Buckley & Durand
Attys.

No. 883,665. PATENTED MAR. 31, 1908.
J. G. NOLEN.
COMBINED POLICE CALL, FIRE ALARM, AND WATCHMAN'S BOX.
APPLICATION FILED MAR. 3, 1904.
5 SHEETS—SHEET 3.
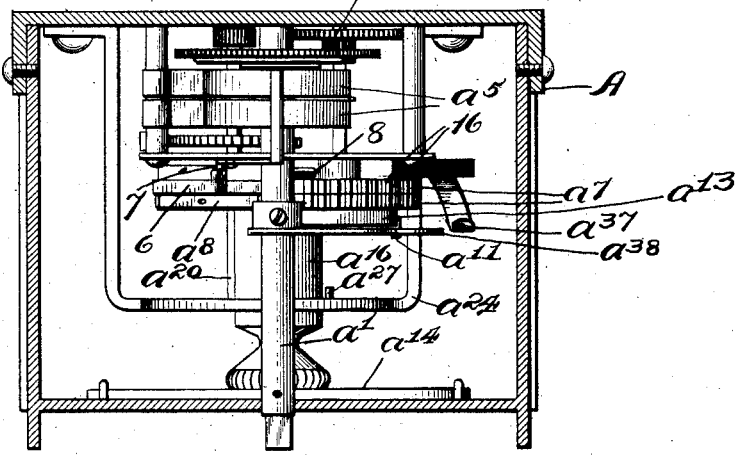
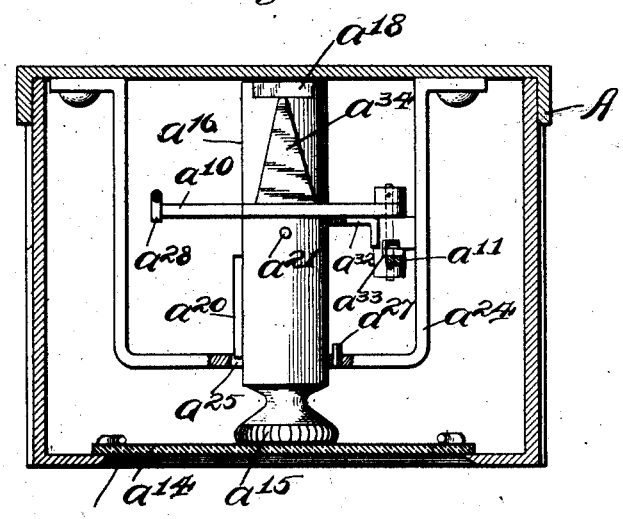
Witnesses
J B Weir
Robert Hiven
Inventor:
James G. Nolen
By Buckley & Durand
Attys.

No. 883,665.  
PATENTED MAR. 31, 1908.  
J. G. NOLEN.  
COMBINED POLICE CALL, FIRE ALARM, AND WATCHMAN'S BOX.  
APPLICATION FILED MAR. 3, 1904.  
5 SHEETS—SHEET 4.
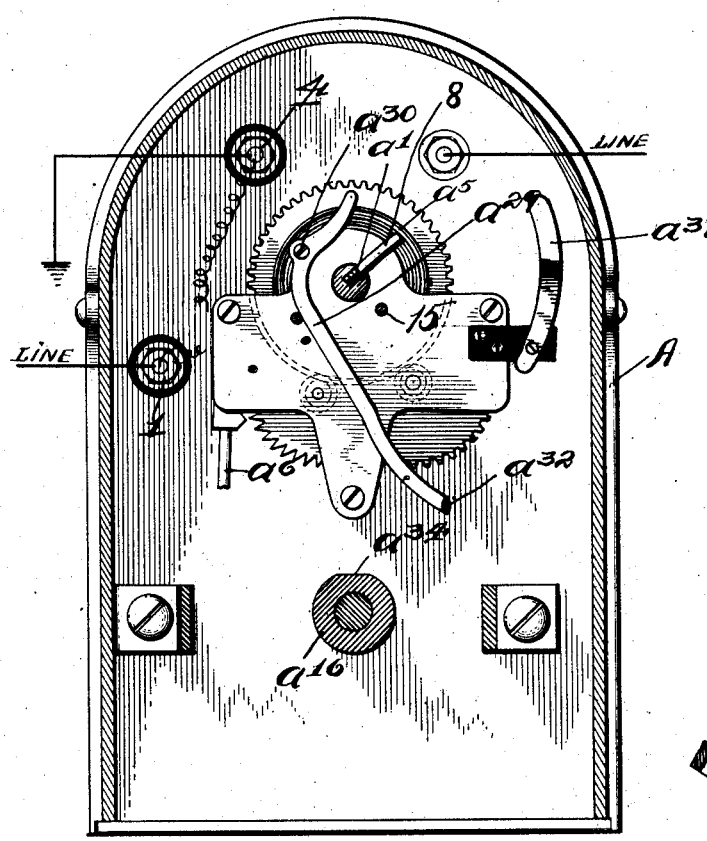
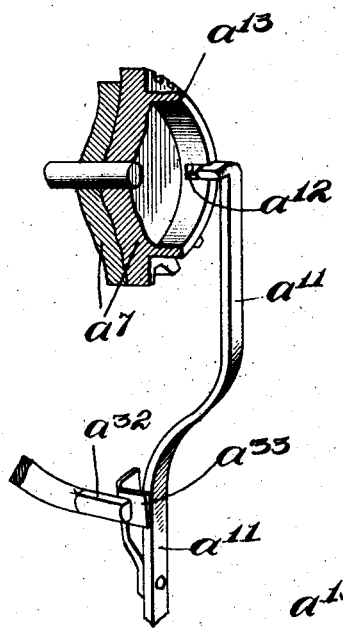
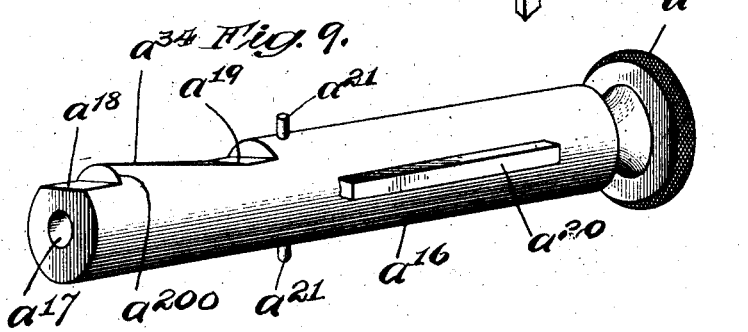
Witnesses:  
J. B. Weir  
Robert H. Weir
Inventor:  
James G. Nolen  
By Bulkley & Durand  
Attys.

No. 883,665. PATENTED MAR. 31, 1908.
J. G. NOLEN.
COMBINED POLICE CALL, FIRE ALARM, AND WATCHMAN'S BOX.
APPLICATION FILED MAR. 3, 1904.
5 SHEETS—SHEET 5.
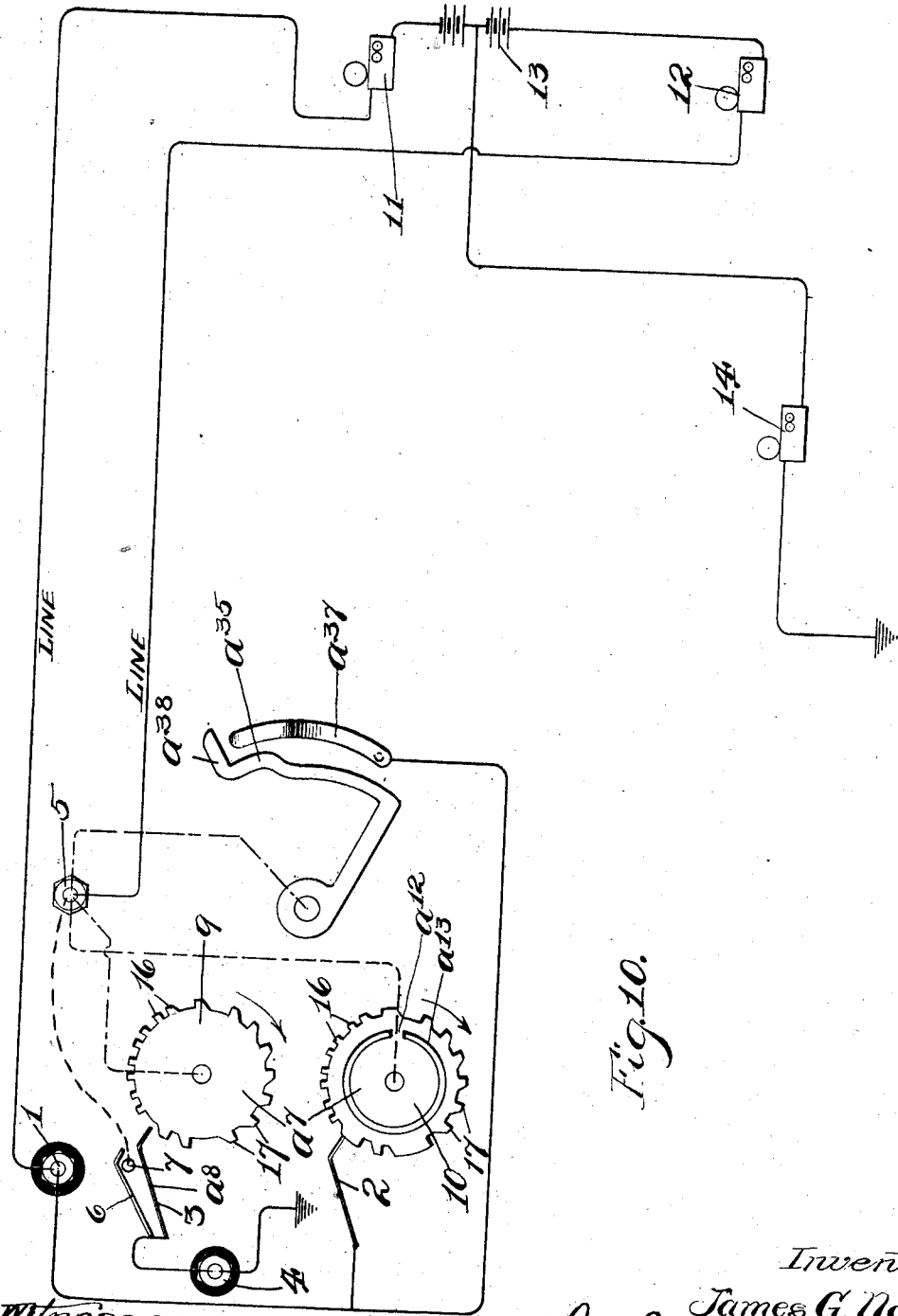

UNITED STATES PATENT OFFICE.

JAMES G. NOLEN, OF CHICAGO, ILLINOIS, ASSIGNOR OF ONE-HALF TO FRANK B. COOK, OF CHICAGO, ILLINOIS.

COMBINED POLICE-CALL, FIRE-ALARM, AND WATCHMAN'S BOX.

No. 883,665.　　　　Specification of Letters Patent.　　　Patented March 31, 1908.

Application filed March 3, 1904. Serial No. 196,435.

To all whom it may concern:

Be it known that I, JAMES G. NOLEN, a citizen of the United States of America, and resident of Chicago, Cook county, Illinois, have invented a certain new and useful Improvement in a Combined Police-Call, Fire-Alarm, and Watchman's Box, of which the following is a specification.

My invention contemplates a manually operated signal transmitting box, capable of use as a police call-box, as a fire-alarm box, and also as a watchman's box.

In a box characterized by my invention, a rotatable knob covered and held positively in its normal position by a glass plate is employed as an element in the means for maintaining the clockwork of the box in a normally wound-up condition, and as the means whereby, when the glass is broken, said clockwork is first operated to transmit a police call-signal, and whereby, after such signal has been sent in, said knob may then be rotated for the purpose of transmitting a fire alarm-signal. Furthermore, in a box characterized by my invention, the clockwork, is although normally wound up, and although employed for transmitting both police, call and fire alarm signals in the manner above stated, always in readiness to be further slightly wound up, whereby the box, when in its normal condition, may be operated to send in a watchman's signal without altering its condition as far as it is capable of sending in police, call and fire alarm signals is concerned. In other words, in a box embodying the principles of my invention, the mechanism is normally such as to automatically send in a police call-signal when the glass at the front of the box is broken; and after this, the knob may then be rotated to again release the clockwork and effect the transmission of a fire alarm-signal; and at any and all times before the transmission of such signals, the box may be operated by a watchman, in the same manner that an ordinary call-box may be operated or "pulled" as it is called, to transmit the watchman's signal; and after a watchman has thus sent in his signal, it is not necessary for him to rewind or do anything whatever to the box, as the transmission of a watchman's signal only necessitates a very slight running down of the clockwork, the mechanism of the box being simply returned automatically to its normal position upon completion of a watchman's signal.

The nature and advantages of my invention will, however, hereinafter more fully appear.

In the accompanying drawings,—Figure 1 is a front elevation of a combined police-call, fire-alarm and watchman's box, embodying the principles of my invention. Fig. 2 is a vertical section on line 2—2 in Fig. 4, showing the clockwork in front elevation. Fig. 3 is a vertical section on line 3—3 in Fig. 4. Fig. 4 is a vertical section on line 4—4 in Fig. 3. Fig. 5 is a horizontal section on line 5—5, in Fig. 2. Fig. 6 is a horizontal section on line 6—6 in Fig. 2. Fig. 7 is a vertical section on line 7—7 in Fig. 4. Fig. 8 is an enlarged perspective of one of the arms of the locking lever, showing also a portion of the make-and-break wheel engaged by the upper end of said arms, and showing also the lower end of the lever for automatically disengaging the locking device to release the clockwork should the spring of the clockwork break. Fig. 9 is an enlarged perspective of the rotary knob and its integral stem for causing the locking device to release the normally wound-up clockwork. Fig. 10 is a diagram of the circuit connections of the different parts of the box, and showing also the line connection between the box and signal-receiving apparatus at the central station.

The casing A of the box may be of any suitable character, but I preferably provide it with a front wall having an opening $a$ for the squared spring-shaft $a^1$ of the clockwork, an upper opening $a^2$ for the shutter or device for indicating whether or not the box is in its normal condition, and a somewhat larger opening $a^3$. The normally wound up clockwork of the box may also be of any suitable known or approved construction, comprising the usual gear wheels, $a^4$, the spring $a^5$, and the usual pendulum or escapement device $a^6$. This normally wound up clockwork is mounted in the usual manner upon the back wall of the box, and is adapted to be wound up in the usual and well known manner by applying a key or small crank to the squared outer end of the spring-shaft $a^1$. The make-and-break devices, whereby the running down of the clockwork is accompanied by the transmission of a signal or signals, may also be of any suitable known or approved construction. For example, the said make-and-break devices may include one or more toothed or notched wheels $a^7$, adapted to engage one or more spring fingers $a^8$, the fingers and toothed wheels being included in the line circuit in the usual well understood manner. When wound up, the clockwork is maintained in such condition by a locking lever $a^9$, said lever having a horizontally disposed arm $a^{10}$, and also a vertically disposed arm $a^{11}$. The arm $a^{10}$ normally engages the lower end of the pendulum or escapement device $a^6$, while the upper end of the arm $a^{11}$ normally engages a notch $a^{12}$ in a laterally extending flange $a^{13}$ on one of the make-and break wheels $a^7$. With the locking lever in such position, it is obvious that the clockwork is maintained in its normally wound up condition until released by movement of said lever.

It will be seen that the inner side of the opening $a^3$ is covered by a glass plate $a^{14}$. This plate practically constitutes the means or element for maintaining the clockwork in the desired normally wound up condition. This is for the reason that the glass plate acts as a stop or abutment against which the rotary knob $a^{15}$ constantly bears when the box is in its normal condition. The said knob is provided with a cylindric stem $a^{16}$, as shown more clearly in Fig. 9, said stem being provided with a bore $a^{17}$, and having also a couple of depressions $a^{18}$ and $a^{19}$ on its upper surface, the two depressions being separated by an elevation $a^{200}$ sloping gradually down to the depression $a^{19}$. Also, as will be observed, the said stem is preferably provided with a longitudinally extending ridge $a^{20}$, and with laterally extending and oppositely arranged pins $a^{21}$. When mounted in place on the spindle $a^{22}$, which latter is rigidly mounted and arranged to project forward from the rear wall of the box, and which fits the bore $a^{17}$ of the stem $a^{16}$, the said knob and its stem are subject to the pressure of the spring $a^{23}$. The said spring is interposed, it will be seen, between the end of a spindle $a^{22}$ and the end of the bore $a^{17}$; and with this arrangement, the glass plate $a^{14}$ normally sustains the tension or spring pressure to which the said knob and its stem are normally subjected. As illustrated, the cylindric stem $a^{16}$ is adapted to slide in the guide $a^{24}$, extending across the interior of the box. With respect to the key or ridge $a^{20}$, the said bar or guide is preferably provided with small notches $a^{25}$ and $a^{26}$. This bar or guide $a^{24}$ acts as a stop against which the pins $a^{21}$ engage for the purpose of limiting the outward movement of the knob and its stem. The rotation of the knob in a clockwise direction is limited by a small pin $a^{27}$, mounted in a yoke-like bar $a^{24}$, and arranged in position to be engaged by the upper pin $a^{21}$. Normally, the arm $a^{10}$ of the locking lever rests in the depression $a^{19}$. As a matter of further improvement, it will be seen that the arm $a^{11}$ has its upper end adapted to engage or ride upon the cylindric outer surface of the flange $a^{13}$ during the rotation of the make-and-break contact devices. In this way, the flange $a^{13}$ and the lever arm $a^{11}$ constitute an arrangement for maintaining the arm $a^{10}$ out of engagement with the lower end-portion $a^{28}$ of the pendulum or escapement device during the running down of the clockwork, also the arm $a^{11}$, by engaging a notch in the flange on the toothed or contact-wheel, serves to assist the arm $a^{10}$ in locking the clockwork in its normally wound-up condition.

Still another matter of improvement consists in the provision of means whereby a signal will be transmitted when the spring of the clockwork breaks, it being observed that this spring is preferably composed of a plurality of sections. Thus, should one section of the spring break, a signal will be transmitted and the necessary repairs made at once. This is preferably accomplished by providing a lever $a^{29}$ pivoted at $a^{30}$. The upper end of this lever is provided with a rearwardly extending pin or projection $a^{31}$, which rests just above the sectional spring. The lower end $a^{32}$ of said lever is adapted to normally engage the flat portion $a^{33}$ secured to the arm $a^{11}$. Thus with all the parts in their normal positions, it is obvious that the breaking of a spring-section, and its engagement in unwinding with the projection $a^{31}$, will cause the lever $a^{29}$ to throw both arms of the locking lever out of engagement with the escapement and the contact-wheels. This permits the remaining portion of the spring to effect the transmission of a signal.

Suppose, now, that some one wishes to send in a police call. In such case, all that is necessary is to break the glass $a^{14}$, thereby allowing the knob and its stem $a^{16}$ to move outwardly under the pressure of the spring $a^{23}$. This endwise or longitudinal movement on the part of the stem $a^{16}$ causes the incline $a^{34}$ on the upper surface of the stem to raise the arm $a^{10}$, thereby disengaging this arm from the escapement device, and also disengaging the arm $a^{11}$ from the notch $a^{12}$ in the flange on one of the make-and-break or contact wheels $a^7$. The flange $a^{13}$ then, of course, prevents the locking arm $a^9$ from again engaging the escapement device until the upper end of the arm $a^{11}$ again enters the notch $a^{12}$. In this way, one "round" as it is called, is sent in as a police-call signal, and the clockwork is then locked against further operation. After thus sending in a police call, should it be desirable to transmit a fire alarm-signal, the knob $a^{15}$ is then rotated in a clockwise direction. It will be seen that at this time the arm $a^{10}$ is resting in the depression $a^{18}$, and that consequently the rotation of the knob on its stem permits the rear end portion of the said stem to act as a cam to raise the arm $a^{10}$. The clockwork being thus again released, another "round" is transmitted over the line-circuit, this second "round" being of such character that it will instantly be recognized as a fire alarm signal. When the knob and its stem move forward under the pressure of the spring $a^{23}$, it will be seen that the key or ridge $a^{20}$ engages in the notch $a^{25}$, and thereby makes it impossible to rotate the stem until after the pin $a^{21}$ has been brought into engagement with the inner surface of the bar $a^{24}$. Then the knob and its stem can be rotated until the upper pin $a^{21}$ strikes the stop $a^{27}$. After this the knob and its stem can be restored to their original positions by thrusting the stem backward, the key or ridge $a^{20}$ passing through the notch $a^{26}$. After this, the knob and its stem can be rotated to the left, so as to permit the ridge $a^{20}$ to again engage the notch $a^{25}$. A new plate of glass can then be adjusted in position, and the box thus restored and maintained in its normal condition.

While the box is in its normal condition, and while it is thus in readiness to be employed as a means for turning in either a police-call or a fire-alarm, or both, it may also be employed as a means for turning in a watchman's signal. This is possible for the reason that even when the mechanism is set for fire, the spring can still be given a slight additional winding, so as to cause the arm $a^{35}$ to engage the upper end of the arm $a^{11}$. This causes the two arms of the locking lever $a^{9}$ to become disengaged from the escapement device, and the notch $a^{12}$, thereby releasing the clockwork. In other words, the watchman, by applying a tool to the spring-shaft $a^{1}$, may, even when the box is in its normal condition, subject the spring to a still further and extreme winding action, and in so doing trip the locking lever. The clockwork then returns to its normal condition, but in so doing causes the make-and-break devices to transmit a single "round," the upper end of the arm $a^{11}$, dropping into the notch $a^{12}$ at the end of such "round;" and the mechanism of the box is then exactly in the same condition as it was before the watchman sent in his signal. Normally, then, the shutter or target $a^{36}$ is visible at the opening $a^{2}$, indicating that the box is set for fire. When the watchman subjects the clockwork to a further winding action to transmit a signal, the said shutter or target swings to the right, but reappears at the opening $a^{2}$ upon the completion of the "round" that is employed as the watchman's signal. Thus it will be seen that with my improved construction and arrangement of parts, the box is capable of use in various ways, and in each case without interfering with its other functions. It will be readily understood that the make-and-break devices can be of any suitable character, and can be included in line circuits of any suitable or desired nature, and that the make-and-break devices can be of such character as to transmit signals, in various different ways and for various purposes.

As a matter of further improvement, I provide means whereby the watchman can not possibly transmit a signal which might be mistaken for a fire-alarm. This is preferably accomplished by providing contacts for short-circuiting the make-and-break device for a portion of a complete rotation of the make-and-break wheels, thus permitting one part of the teeth to effect a make-and-break action in the circuit during said rotation. For example, an insulated contact-strip $a^{37}$ can be provided and arranged in such position that it is engaged by the upper end portion $a^{38}$ of the arm $a^{35}$ during the transmission of the watchman's signal. The said contact $a^{37}$ is connected with the insulated binding post 1, with which latter the outer spring 2 is also connected (see Fig. 10). The inner spring 3 is connected with the insulated binding post 4, which latter is connected to ground. The insulated binding post 1, and the non-insulated binding-post 5, are connected, as shown, with the line conductors. The spring 3, of the two springs indicated generally by $a^{8}$, is preferably provided with a portion 6, adapted to be pressed into contact with the non-insulated contact-pin 7 by the pin 8, on the spring-shaft when the clockwork runs completely down.

Referring to Fig. 10, it will be seen that the contact 7, the inner contact-wheel 9, the outer contact-wheel 10, and the swinging-arm $a^{35}$ are all electrically connected through the casing of the box with the binding-post 5. At the central station the signal-receiving apparatus may be of any suitable known or approved character. Preferably, however, and with respect to the grounded spring 3 of the box, the said signal-receiving apparatus comprises a pair of recorders, 11 and 12, of the usual and well known character, connected in the line at each side of the battery 13. It will be seen that the middle point of this battery is grounded through a third recorder or signal-receiving device 14. With this arrangement, the clockwork when released revolves the two make-and-break wheels $a^{7}$, the wheel 10 transmitting a signal which is received by the recorders 11 and 12 through a circuit traceable from battery 13 through the upper limb of the line, the pen 2, wheel 10, box frame and lower limb of the line back to the battery. At the same time the wheel 9, intermittently closing a ground circuit from ground through binding post 4, pen 3, wheel 9, the box frame, lower limb of the line, lower half of the battery and the recorder 14 to ground, causes recorder 14 to receive a signal. When the clockwork has run completely down, the portion 6 of the spring 3 is pressed against the contact 7, thereby keeping the line circuit and the apparatus in such condition that prompt and immediate attention will necessarily be given the box. In other words, the grounded signaling circuit will remain charged or closed until the proper attention is given the apparatus.

Now with respect to the operation of the means by which the watchman cannot possibly send a signal which would be confused or mistaken for a fire-alarm: It will be seen that when the spring-shaft is rotated in a clockwise direction to the limit of its rotation in this manner, the end-portion $a^{38}$ slides over and past the raised contact surface of the contact $a^{37}$; and that the clockwork, when released, just as the pin 8 strikes the stop 15 causes the portion $a^{38}$ to first travel a short distance before striking the raised or contact surface of the contact $a^{37}$. This preliminary travel on the part of the portion $a^{38}$ is accompanied by the transmission of so much of the signal as is effected by the contact of the coarse teeth of the two wheels $a^7$; but as soon as the portion $a^{38}$ strikes the contacting portion of the contact $a^{37}$ of the make-and-break device, the springs and wheels are thereby short-circuited, and, consequently, the remainder of the rotation of the two wheels is not accompanied by make-and-break action affecting registers 11 and 12 in the line-circuits. The short circuit thus established may be traced from battery 13 through the upper limb of the line, binding post 1 to contact $a^{37}$, arm $a^{35}$ the box frame, binding post 5, and lower limb of the line back to battery. Consequently wheel 10 can not transmit a signal at all and wheel 9 can transmit only to the recorder 14 by the circuit heretofore described, but the failure to transmit the full signal to recorders 11 and 12 clearly distinguishes such signal from a fire signal. Thus, the relatively small teeth 16 of the two wheels really constitute the means for producing the fire-alarm upon registers 11 and 12, and when the distinctive make-and-break action produced by these teeth is omitted from the signal as a whole, it would be easily understood that the signal is not for fire; and this, it will be seen, is true, regardless of the number of times the watchman operated the spring-shaft, or "pulled" the box as it is called. Preferably, the spring-shaft rotates, say, about four-sixths of a complete rotation, thereby producing four complete rotations on the part of the two make-and-break wheels. Thus, it is obvious that the watchman's signal is accomplished through a single complete rotation of the make-and-break wheels, and that during such rotation only the relatively coarse teeth 17 of the two wheels are employed in transmitting the signal to the recorders 11 and 12. But when the clockwork is released from its normal condition—that is to say, the condition in which it is illustrated, it is also obvious that the other three complete rotations of the make-and-break wheels will be accompanied by the transmission of a signal in which both the relatively coarse and relatively small teeth of the wheels are employed; and, as stated, it is the peculiar or distinctively signaling action produced by the relatively small teeth at the latter part of each rotation of the make-and-break wheels which really constitutes the fire-alarm signal. Consequently, the attendant at the central station can always readily recognize a watchman's signal, and can also easily, and without fail, recognize a fire-alarm signal by the peculiar and distinctive signaling action produced by the relatively small teeth immediately after or following the signaling action produced by the relatively coarse or large teeth.

What I claim as my invention is:

1. A box for transmitting signals comprising normally wound-up clock work, and means for releasing said clock work comprising a rotary and axially movable part, operatively associated with the clock work to release said clock work by either rotary or axial movement.

2. A box for transmitting signals comprising a normally wound clock work and means for releasing said clock work comprising a rotary and axially movable handle adapted and arranged by axial movement to once release the clock work and by rotary movement to again release said clock work.

3. A box for transmitting signals comprising a normally wound clock work, locking means therefor, normally maintaining said clock work inactive, and adapted by movement of a part thereof to abnormal position to condition the clock work for activity, and a handle susceptible of successive automatic and manual actuation, arranged when automatically actuated to move the said part of the locking means to abnormal position and permit its return to normal position and when manually actuated to again move the said part of the locking means to abnormal position.

4. A box for transmitting signals comprising a clockwork normally wound, and adapted when fully released to transmit an alarm, a handle mounted for two distinct movements of different direction, and means for fully releasing said clockwork associated with the handle for control thereby, and functionally operable only by manipulation of the handle through both its distinct movements.

5. A box for transmitting signals, comprising normally wound-up clockwork, a locking lever for locking the clockwork in its normally wound-up condition, a rotary and axially movable member provided with two depressions, said locking lever engaging one of said depressions, a glass plate engaging the end of said member, and spring means acting to shift said member axially upon the breaking of said glass, said member being provided also with an inclined surface intermediate of said depressions, whereby the axial movement of said member causes said locking lever to release the clockwork.

6. A box for transmitting signals, comprising normally wound-up clockwork, a contact-wheel provided with a flange having a notch, a locking lever provided with an arm engaging the escapement device of said clockwork, and provided with another arm engaging said notch, a spring acting to hold said arm in engagement with said notch, a rotary and axially movable member provided with two depressions and having also an inclined surface between the said depressions, the locking lever normally engaging one of said depressions, a glass plate engaging one end of said member, and a spring tending normally to force said member against said glass-plate, whereby the glass when broken permits said member to release the clockwork and thereby rotate said contact wheel until the arm again engages said notch, and whereby said clockwork may then again be released by partial rotation of said member.

7. A box for transmitting signals, comprising normally wound-up clockwork, a rotary and axially movable handle, means whereby an axial movement of said handle produces a partial unwinding of said clockwork, and means whereby a rotation of said handle then produces a further and complete unwinding of said clockwork.

8. A box for transmitting signals, comprising normally wound-up clockwork, a locking device for maintaining said clockwork in its normally wound-up condition, the springs of said clockwork made in sections, and a pivoted member having one end engaging said locking means and the other end in position to be engaged by a broken spring-section, whereby the clockwork is released upon the breaking of a spring section; and there being also a make and break device operated by the clockwork, and a hand-operated device for manually releasing the normally wound-up clockwork, when it is desired to transmit an alarm signal.

9. A transmitter comprising a spring-driven clockwork, releasable means for normally maintaining said clockwork spring in partially wound condition, subject to further winding, and means for automatically releasing the clockwork to permit return of its spring to normal condition when fully wound.

10. A box for transmitting signals comprising normally wound clockwork, a suitable make and break device adapted to make two or more "rounds" during the running down of the clockwork, a suitable circuit for said make and break device, and means for short circuiting the make and break device during a portion of one only of its "rounds."

11. A box for transmitting signals comprising normally-wound clockwork, a suitable make and break device adapted to make two or more rounds during the running down of the clockwork, suitable circuit connections for said make and break device, means for conditioning the clock-work to make one round for one signal and two or more rounds for a fire signal, and means for short circuiting the make and break device during a portion of its first round only.

12. A box to transmit signals, comprising normally and partially wound-up clockwork, a locking device for stopping and maintaining the clockwork in its normal condition, a tripping device for automatically releasing the clockwork upon a complete winding up of the same, a make-and-break device adapted to be operated by the clockwork to transmit a signal, means for rendering the make-and-break device inoperative to produce a signaling action for a portion of its operation when the clockwork is released by said tripping device.

Signed by me at Chicago, Cook county, Illinois, this 1st day of March, 1904.

JAMES G. NOLEN.

Witnesses:
SEVERINUS B. CHABOWSKI,
WM. A. HARDERS.